United States Patent [19]

Tate et al.

[11] Patent Number: 5,408,631
[45] Date of Patent: Apr. 18, 1995

[54] INTERFACE UNIT CIRCUIT WITH ON-CHIP TEST SIMULATION

[75] Inventors: Steven C. Tate, Manti; Laird A. Evans, Centervill; Dennis R. Godderidge, Farmington, all of Utah

[73] Assignee: Unisys Corp., Blue Bell, Pa.

[21] Appl. No.: 32,575

[22] Filed: Mar. 17, 1993

[51] Int. Cl.⁶ .............................................. G06F 13/00
[52] U.S. Cl. ..................................... 395/425; 370/92; 371/22.1
[58] Field of Search ............................... 371/2.2, 22.1; 370/85.1, 85.6, 85.7, 92; 395/250, 275, 400, 425

[56] References Cited

U.S. PATENT DOCUMENTS 5,072,377 10/1991 Asai et al. ............................ 395/400
5,276,848 1/1994 Gallagher et al. ................... 395/425
5,333,269 7/1994 Calvignac et al. ............. 395/325 X Primary Examiner—Emanuel T. Voeltz
Assistant Examiner—Edward Pipala
Attorney, Agent, or Firm—John B. Sowell; Mark T. Starr

[57] ABSTRACT

A novel interface unit circuit for connecting circuit card assemblies to a data stream and to each other is designed for implementation on a high speed semiconductor chip. A parallel bit data word comprising a programmable address field is compared to a mask address stored in buffer registers and in the presence of a match, the parallel bit data word is stored in a sink register. Also the address field of the data word is filled with zeros and passed to the output of the data channel where the time slot for the data word may be written over with new data words or the time slot passed on to other circuit card assemblies or other elements.

14 Claims, 7 Drawing Sheets

TRUTH TABLE

| @122 NULL | @58 REQ 1 | @57 REQ 0 | @33 OUTPUT | @79 ACK 0 | @81 ACK 1 |
|---|---|---|---|---|---|
| 0 | 0 | 0 | PASS THRU | 0 | 0 |
| 0 | 0 | 1 | PASS THRU | 0 | 0 |
| 0 | 1 | 0 | PASS THRU | 0 | 0 |
| 0 | 1 | 1 | PASS THRU | 0 | 0 |
| 1 | 0 | 0 | PASS THRU | 1 | 0 |
| 1 | 0 | 1 | SOURCE 0 | 0 | 0 |
| 1 | 1 | 0 | SOURCE 1 | 0 | 1 |
| 1 | 1 | 1 | SOURCE 1 | 0 | 1 |

FIG. 7

INTERFACE UNIT CIRCUIT WITH ON-CHIP TEST SIMULATION

RELATED APPLICATIONS

This application relates to our U.S. application Ser. No. 08/032,574, now U.S. Pat. No. 5,339,312, filed Mar. 17, 1993, for a STATION INTERFACE UNIT.

BACKGROUND OF THE INVENTION

1. Field of the Invention

The present invention relates to interface units of the type employed on circuit card assemblies (CCAs) to interconnect logic function circuit elements. More particularly, the present invention relates to a novel low power interface circuit designed for implementation on a single gallium arsenide gate array chip and having on-chip test simulation circuits which enables testing of the interface chip and its associated functional elements on a circuit card assembly.

2. Description of the Prior Art

Heretofore, numerous types of interface circuits have been implemented as multiple chips packaged in a single carrier or container. Such packaged interface chips have been employed to connect various types of input-output equipment to a common bus or data path. Such commercially available interface units are usually limited to a special set of input-output interface conditions, are not programmable and do not provide an on-package test circuit.

Accordingly, it would be extremely desirable to provide a novel high speed ECL compatible interface unit circuit which incorporates on-chip test circuitry, high speed logic, and is processor programmable for operating and test purposes.

SUMMARY OF INVENTION

It is the principle object of present invention to provide a novel low logic level interface circuit for implementation on a single gallium arsenide semiconductor chip.

It is another principle object of the present invention to provide a novel interface circuit on a high speed gate array chip that is compatible with ECL functional elements operating at 200 mega words per second.

It is another object of the present invention to provide a novel high speed interface circuit having a plurality of different selectable clock sources.

It is another object of the present invention to provide a novel interface circuit having input simulation points for testing the interface gate array chip and its associated circuitry in a real time or step by step mode of operation.

It is another object of the present invention to provide a novel gate array interface chip having a test counter and a pseudo random bit stream (PRBS) generator source on-chip for making on-chip and off-chip test of circuits and CCAs.

It is another object of the present invention to provide a novel simulator circuit in an interface circuit which will accept-software test programs for testing the interface circuit and associated CCA functional circuits.

It is another object of the present invention to provide a novel interface unit circuit having a plurality of sink and source buffer registers arranged in parallel to permit parallel sink or pass through operations.

It is another principle object of the present invention to provide a high speed ECL compatible interface unit having a novel fast acting zero null and pass through logic for use in a daisy chain mode of operation.

It is yet another object of the present invention to provide a novel interface circuit which permits use of an external clock to read out its source buffer register so as to synchronize the source information to its associated CCAs and/or connected bus structure.

It is yet another object of the present invention to provide a novel dual interface circuit unit on a single gate array chip for operation in a dual/parallel or single/series mode of operation.

It is yet another principle object of the present invention to provide a novel circuit for programming a parallel bit word having a variable address field and variable data field.

It is yet another principle object of the present invention to provide a programmable interface circuit wherein the address field of the sink, source (destination) and pass through addresses may be pre-programmed from an associated computer.

According to these and other objects of the present invention there is provided a high speed interface circuit for implementation on a gallium arsenide ECL compatible gate array circuit. Said interface circuit having a plurality of clock sources including an external asynchronous clock and a synchronous clock derived from the master clock. Said interface circuit having a sink input buffer register coupled to the master clock and a sink output buffer register coupled to the input buffer register and the external clock. An input simulator is interposed in the parallel bit input data stream coupled to the sink input buffer register. Said input simulator is provided with a computer controlled selector having a plurality of inputs including a computer programmable input and the input data stream to permit the input data to pass through on the main data stream unaltered or to be loaded into the sink input buffer register and the main data stream to be altered to indicate a null or to permit simulated data to pass into the main data stream for testing the interface circuit and/or functional circuits connected to the interface circuit.

BRIEF DESCRIPTION OF THE DRAWINGS

FIG. 7 is a truth table which is employed to explain the output of the novel arbitration circuit shown in FIG. 6.

DETAILED DESCRIPTION OF THE PREFERRED EMBODIMENT

Figure 1:
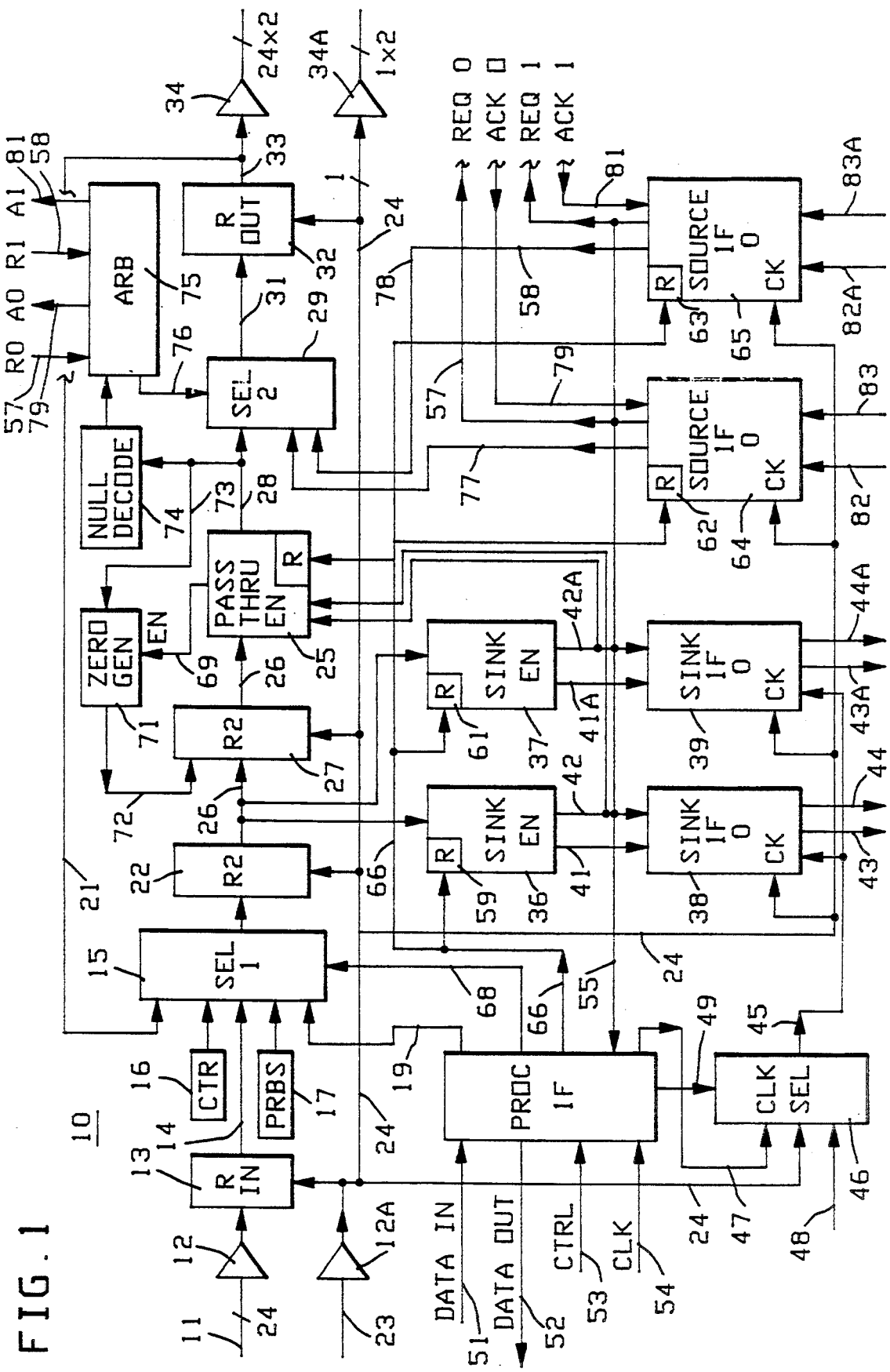
FIG. 1 is a schematic block diagram of a preferred embodiment interface unit circuit chip having test simulation circuits built into the chip.

Refer now to FIG. 1 showing a preferred embodiment of the present invention interface unit circuit 10 which is designed to be implemented on a single gallium arsenide circuit chip. Before describing in detail the elements of the circuit 10 it is to be noted that the present invention will be described employing a 24 bit address-data bus and employing a differential clock. The 24 address-data bits are divided into 4 fixed field address bits, 16 fixed field data bits and 4 remaining bits which can be programmed as either address bits or data bits. Thus, the number of programmable bits in the address field and data field may be varied to suit the design requirements for other uses. Data bus 11 is shown comprising 24 differential bits which are coupled to an input receiver 12 which is coupled to input register 13. The parallel data stored in input register 13 is provided on bus 14 to selector 15 shown having five selectable inputs. High speed counter 16 is provided as a selectable input for testing the gate array circuit chip as well as its associated functional circuit element such as those found on a circuit card assembly (CCA). Those skilled in the art recognize that a high speed counter 16 may be employed to simulate data in a real time mode of operation. The pseudo random bit stream generator 17 (PRBS) is employed to test for intermittent conditions in the gate array circuit or its associated CCA functional elements including the bus into which the CCA is ordinarily connected. A fourth selector input on line 19 from processor interface 18 can provide processor inputs using lines 51, 53 and 54 etc. The fifth selector input shown on bus 21 is a feedback path provided at the output of the data channel which provides a desirable built in test capability for testing the connection between the interface unit circuit 10 and its associated CCA functional elements.

The selector 15 does not cause a clock element delay as the data on bus 14 passes through to the first buffer register 22 which is clocked in and clocked out by the master bus clock provided at input line 23 and processed through receiver 12A to provide the system clock on line 24. The twenty-four bit data word clocked into register 22 is clocked through the pass through enable circuit 25 via sink bus 26 and into the second buffer register 27 at the next following master clock time. The pass through enable circuit 25 does not impose a clock delay but does impose a slight logic delay during pass through. The 24 bits in register 27 are presented on line 28 to the second selector 29. The original 24 bit word may be passed through the selector 29 unaltered onto the output data channel bus 31 where it is stored in the third buffer or output register 32 for presentation on output bus 33 to the transmitter 34 which provides a 24 bit differential data stream on bus 35.

The data word stored in register 22 is available to two parallel sink enable circuits 36 and 37 which determine whether the data in register 22 will be stored in the sink IF buffer registers of the sink interfaces 38 and 39 respectively. The sink enable circuit 36 is looking for a sink destination address match which matches the mask address stored in the sink enable circuit 36. If the address match occurs, the information which is already presented to the register in the sink interface 38 will be clocked into and stored in the buffer registers in the sink interface 38 as will be explained in greater detail hereinafter.

The same mode of operation occurs between the sink enable circuit 37 and the sink interface 39 which operate in parallel and may employ different or identical mask addresses. The master clock on line 24 is shown connected to the clock input of the sink interfaces 38 and 39 for clocking data words from register 22 into the buffer registers in the sink interfaces 38 and 39. The output from the sink enable circuit 36 is shown on lines 41 and 42 as the data and enable information which is applied to the input of the sink interface 38. The output of the sink interface 38 is shown provided on data line 43 and clock line 44 which will be passed to a functional element on a CCA as will be explained in greater detail hereinafter. The information being passed on line 43 and 44 may be clocked by a selectable clock line 45 at the output of clock selector 46. Selector 46 has three different clock selectable inputs, one of which is the master Clock on line 24, the second of which is the microprocessor generated clock on line 47 and the third is the external clock on line 48 from a CCA functional element. The three distinct and different clock inputs to the clock selector circuit 46 are processor selectable via line 49 from the processor control interface 18.

Four of the numerous inputs to the processor interface 18 are shown as input lines 51, 53, and 54 labeled data in, control and clock. A data out line 52 is employed to collect status data originating on bus 55 which is preferably connected to numerous points throughout the circuit including enable lines 42, 42A and request lines 57, 58 as well as other lines which may be monitored. Further, the off-chip processor can provide data in on line 51 which is used to program the registers 59 and 61 which form portions of the address and data fields in the sink and enable circuits 36 and 37 to be described hereinafter. Further, the programmable registers 62 and 63 in the source interface circuits 64 and 65 may be employed to program the source address provided on control line 66 from the processor interface 18.

A programmable register 67 is provided in the pass through enable circuit 25 to enable the pass through function to be described hereinafter. When the processor interface 18 selects the bus 14 via line 68, the data word in register 13 is stored in register 22 and provided as an output on bus 26A to the pass through and enable circuit 25. All information on bus 26 is passed through to bus 28 when certain conditions are met in the pass through circuit using register 67 and Sink Enable inputs 42 and 42A which will be described hereinafter. When these conditions are not met the upper eight address bits which are presented on line 69 to the zero generator 71 are presented as zeros on line 72 to the selector 29. When conditions are met the eight address bits on line 69 are not altered and are passed through on line 72 as the upper eight address inputs to selector 29. Any time the zero generator nulls the address field or the existing address field was zero, the information is available on line 73 to the null decode circuit 74 and also presented on pass through bus 28 to form the upper eight bits of a 24 bit data word at the input of selector 29. The selector 29 passes information onto the data channel 31. The information presented on output data channel 31 to the output register 32 is available as an output data word. When the source interface circuits 64, 65 place information on the output data channel bus 31, they raised their respective request zero and request one signals on lines 57 and 58 which are shown as inputs to the arbitration circuit 75. When conditions permit, the arbitration circuit 75 raises an enable or select signal on line 76 which will select either data line 77 or data line 78 instead of an input from bus 28. As will be explained hereinafter, the selection of a data source on line 77 or 78 causes the arbitration circuit 75 to raise an acknowledge signal on lines 79 or 81 which is inputted back to the source interface circuit 64 or 65 respectively. As will be explained hereinafter, the request signals are generated when a clock on line 83 is presented with data on line 82 as an input to the source interfaces 64 or 65.

Figure 2:
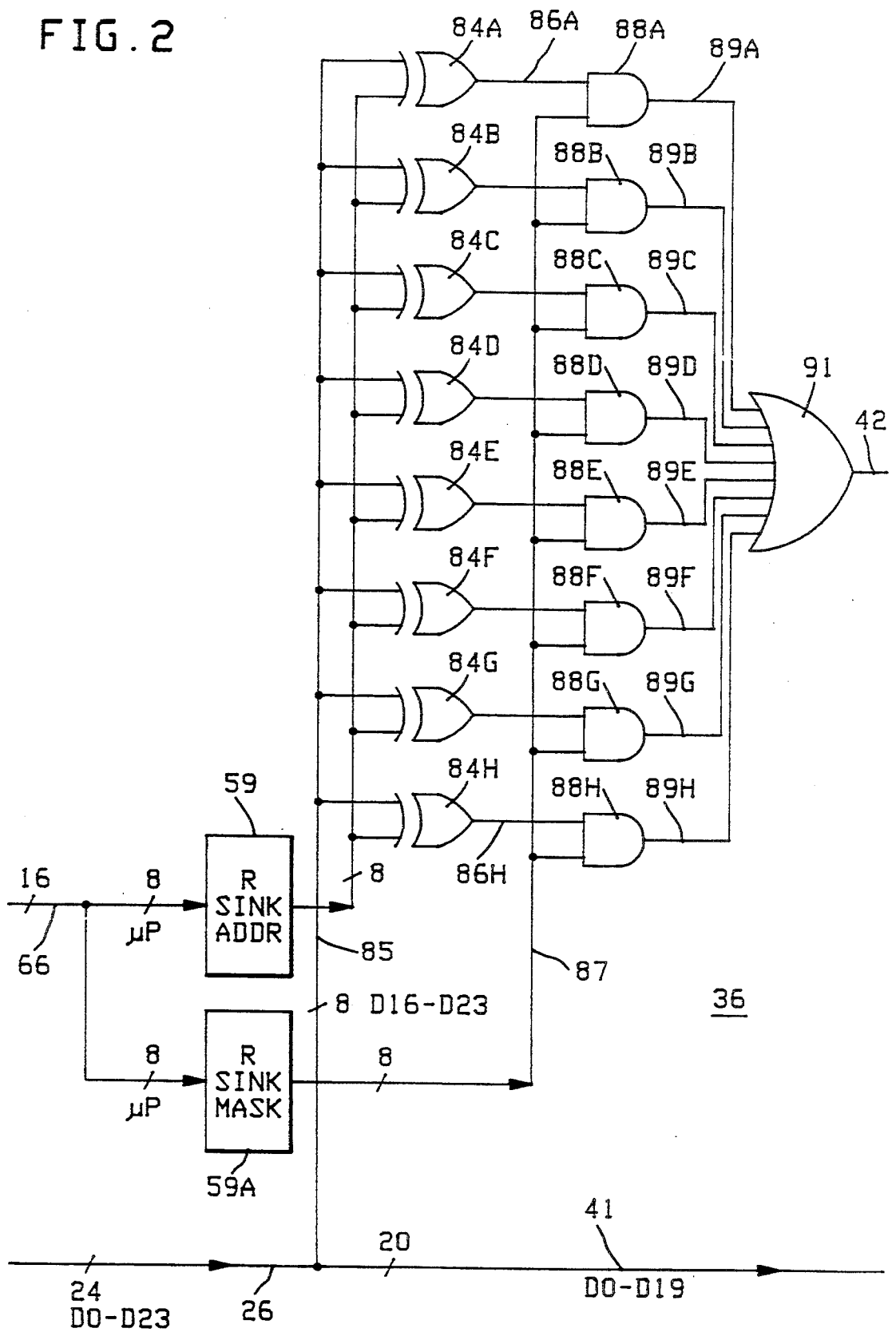
FIG. 2 is a more detailed schematic block diagram of the novel sink enable circuit shown in FIG. 1.

Refer now to FIG. 2 showing a schematic block diagram of the novel sink enable circuits 36 and 37. The processor control line 66 is shown having 16 address control bits which are connected by line 66 to the 8 bit sink address and sink mask registers 59 and 59A respectively shown as register 59 on FIG. 1. The output from sink address register 59 is shown as 8 bits connected to the input of eight exclusive OR gates 84A to 84H which perform the address match function for the sink enable circuit. The upper 8 bits, D16 to D23, are presented on sink bus 26 to the exclusive OR gates 84 via line 85 to perform the match function. Each match that occurs at the input to the exclusive OR gates 84 will generate a zero on lines 86A to 86H respectively. The 8 bit address stored in the sink mask 59A is presented on line 87 to AND gates 88A to 88H. Each zero in the sink mask will force the output of its corresponding AND gate 88 to be zero thus ignoring the effect of its corresponding input from line 86. Each one in the sink mask will allow the input from the respective line 86 to be passed through to the output of its corresponding AND gate 88. Thus under processor control certain inputs from line 85 can be thought of as don't care inputs. The outputs of lines 89A to 89H are presented to NOR gate 91 which generates a high output signal NOR gate 91 which generates a high output signal on line 42 if all input signals are low. The outputs on lines 41 and 42 from the sink enable circuit 36 are the same outputs on lines 41 and 42 in FIG. 1. Stated differently, the sink enable signal is raised on line 42 when all of the address bits except the don't care bits form a match with the address field portion of the data word.

Figure 3:
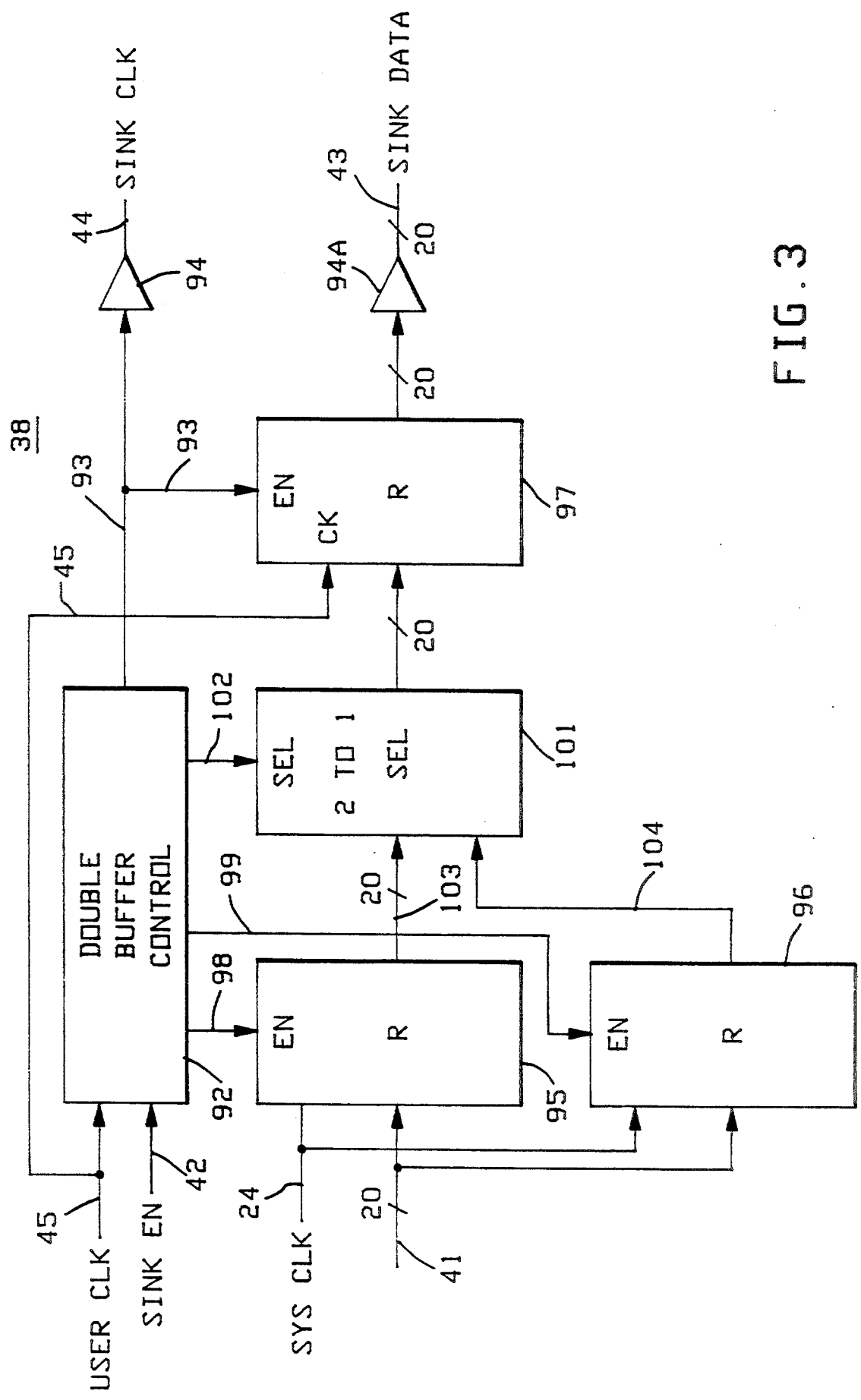
FIG. 3 is a more detailed schematic block diagram of the novel sink interface circuit shown in FIG. 1.

Refer now to FIG. 3 showing a detailed schematic block diagram of the novel sink interface circuits 38 and 39. All the elements shown as interface 38 are embodied inside of the sink interface circuit 38. The double buffer control 92 is shown having the previously described clock 45 and sink enable inputs which produce the sink clock output on line 44 via line 93. Double buffer control 92 is shown coupled to registers 95, 96 and 97 via lines 98, 99 and 93 respectively. Two to one selector 101 is also coupled to buffer control 92 via line 102. The double buffer control 92 performs a standard double buffer function with registers 95 and 96 using the clock enable signals on lines 98 and 99 instead of the normal gated clocks which employ the system clock. The system clock on line 24 will clock the information on bus 41 into one of the registers 95 or 96 depending on which has its enable raised. The data first presented to register 95 or 96 is available on output lines 103 or 104 to the select circuit 101 and is passed to register 97 where it is stored therein when the enable on line 93 is raised and the user clock on line 45 clocks the data in. The output from register 97 is applied to driver 94A to form the sink data output on line 43 with its corresponding clock on line 44 as shown in FIG. 1. It will be appreciated that the data output on lines 43 and 44 is synchronized with the user clock on line 45 but is not synchronous with the double buffer 92 output which is controlled by the systems clock on line 24.

Figure 4:
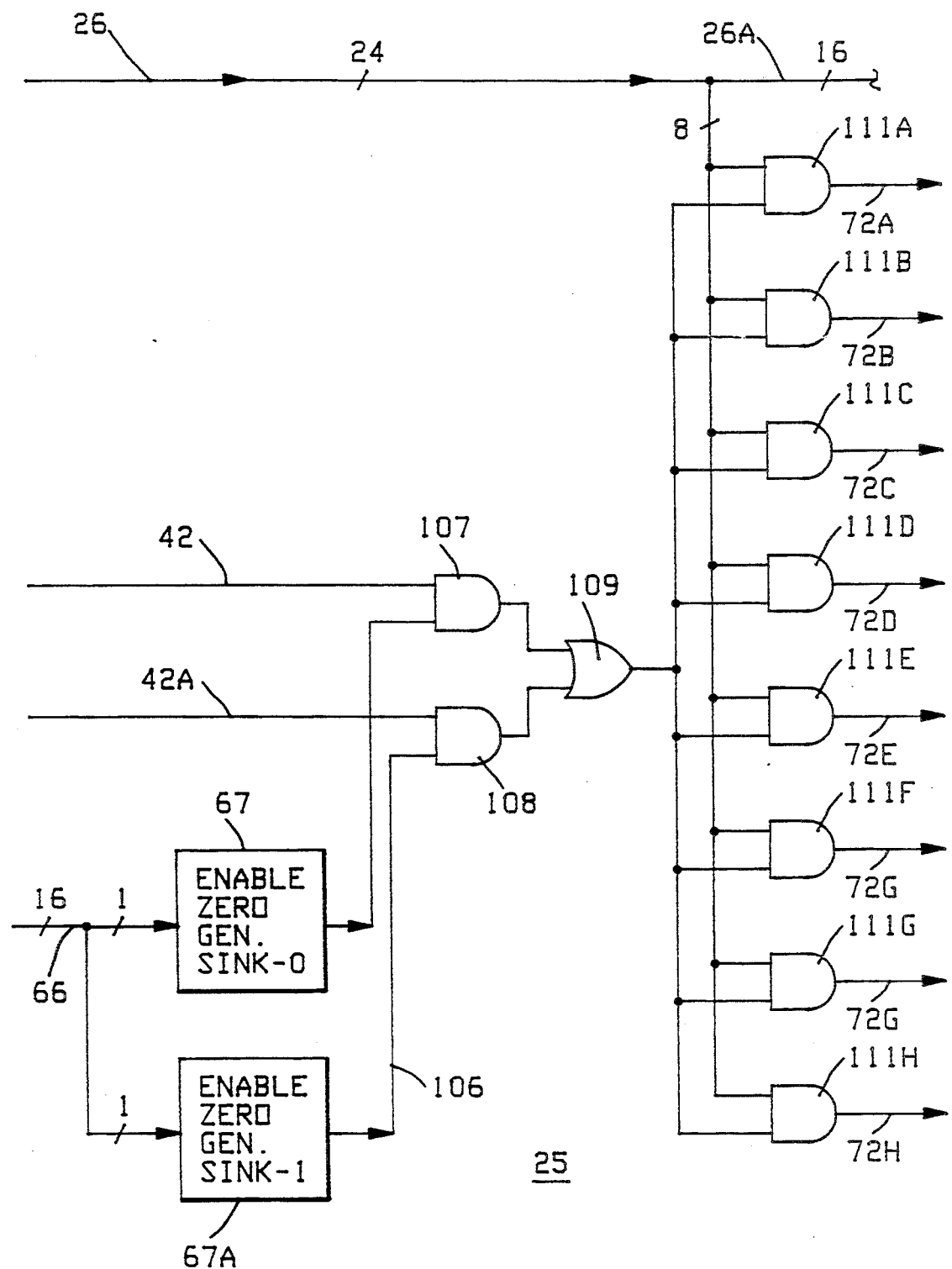
FIG. 4 is a more detailed schematic block diagram of the novel pass through enable circuit shown in FIG. 1.

Refer now to FIG. 4 showing a schematic block diagram of the pass through enable circuit 25 which is coupled to the zero generator 71. The processor control lines 66 are shown connected to the input of pass through register 67 and pass through mask 67A to produce outputs on lines 105 and 106 respectively. When register 67 is programmed with line 105 as a high, a high on line 42 will cause a high output from AND gate 107. This high output will cause the output of NOR gate 109 to go low. A low on line 69 will cause the outputs of AND gates 111A through 111H to be zeros. Similarly, when register 67A is programmed with line 106 as a high, a high on line 42A will cause a high output from AND gate 108. This output will likewise cause the output of NOR gate 109 to go low. A low on line 69 will cause the outputs of AND gates 111A through 111H to be zeros. Thus, either line 42 or line 42A or both can be enabled to force zeros on lines 72A to 72H. Twenty-four address and data bits are presented on line 26 where the 8 address bits are stripped off and applied to the AND gates 111A through 111H via line 69A. Circuit 71 zeros these 8 address lines when a signal from line 42 or 42A is enabled to cause a low on line 69. A high signal on lines 69 from NOR gate 109 causes the address which was stripped off of line 26 onto lines 69A to be passed through AND gates 111A to 111H to form the original address bits of the data word on lines 72A to 72H.

Figure 5:
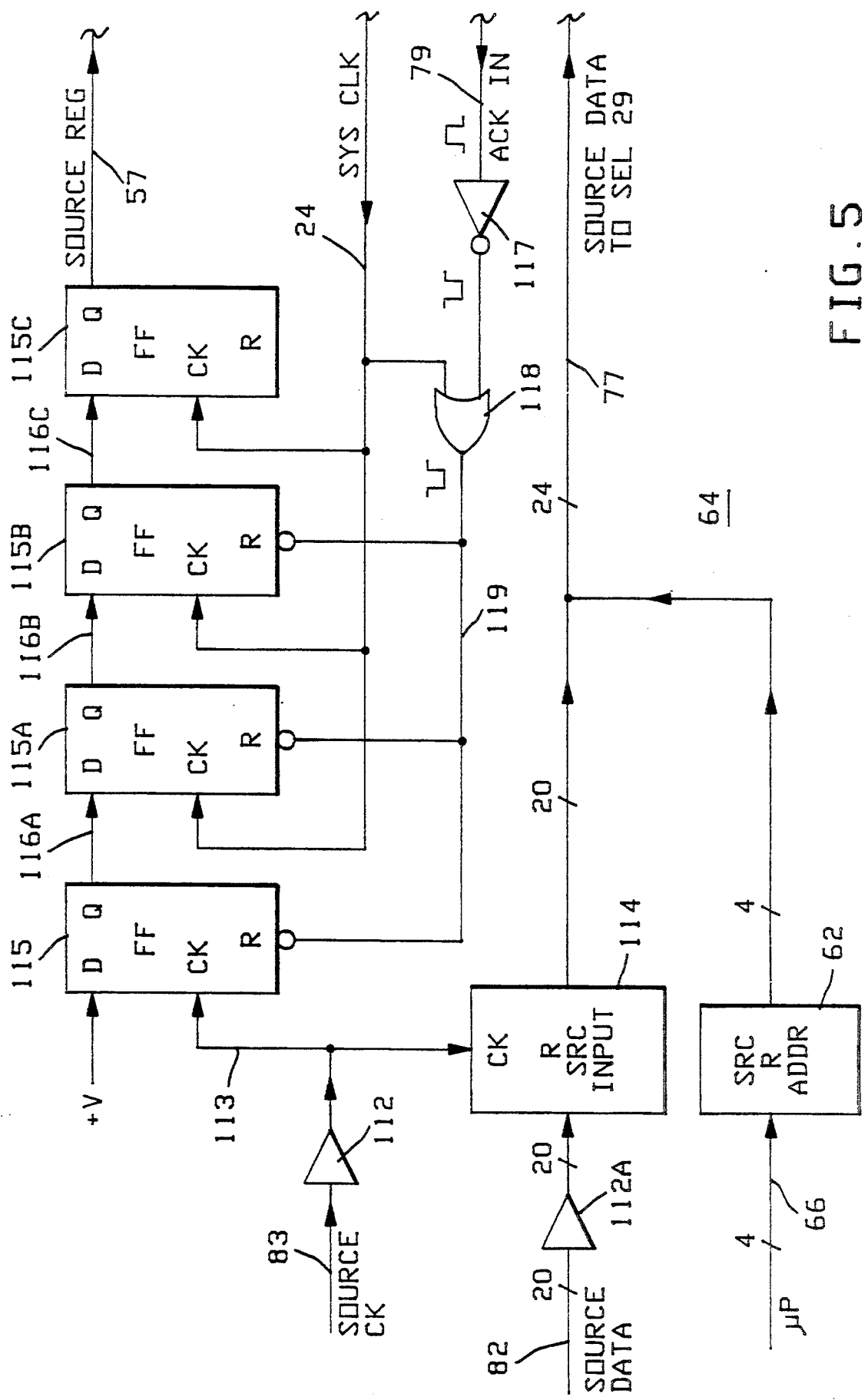
FIG. 5 is a more detailed schematic block diagram of the novel source interface circuit shown in FIG. 1.

Refer now to FIG. 5 showing a schematic block diagram of the novel source interface circuit 64. The source clock on line 83 is applied to a receiver 112 which produces the source clock on line 113 that is applied to a source input register 114 and a first flip flop 115 which is daisy chained to three identical flip flops 115A through 115C. The data input D of flip-flop 115 is coupled to a plus voltage source so that the clock enable signal on line 113 passes the data to the Q output on line 116A and each subsequent system clock pulse on line 24 applied to the clock enable input of the flip-flops 115A, 115B and 115C clocks the data along the chain via lines 116B and 116C to the source request output line 57 described hereinbefore. The reason for employing three system clock pulses to delay the progression of the source request on line 57 is to avoid the possibility of a metastable condition arising because the source clock and systems clock are not synchronized. When an acknowledge IN is returned on line 79 via inverter driver 117 and OR gate 118, a low reset signal is produced on line 119 which resets the first three stages of the flip-flop chain. As will be explained hereinafter when the acknowledge IN signal goes high on line 79 the selector 29 is enabled to receive the data stored in source input register 114. Source input register 114 is loaded with source data on line 82 via receiver 112A. The 20 bits of information at the output of register 114 is concatenated with the 4 bits of source address information from register 62 which was loaded by the input on line 66. Together the outputs of registers 114 and 62 form the 24 bit source data to selector 29 on line 77 described hereinbefore with reference to FIG. 1.

Figure 6:
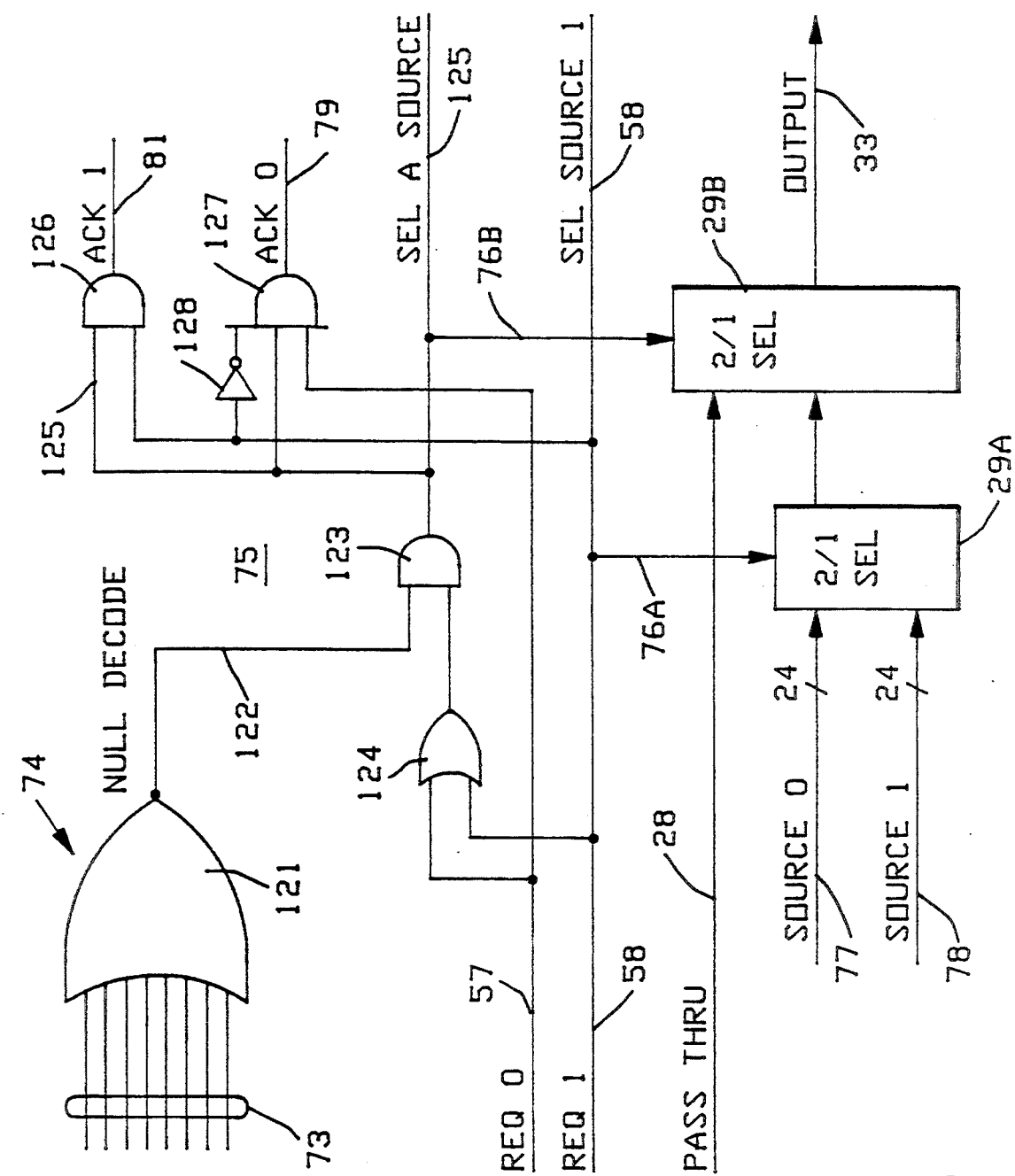
FIG. 6 is a more detailed schematic block diagram of the novel null decode and arbitration circuit shown in FIG. 1.

Refer now to FIG. 6 showing a block diagram of the novel null decode and arbitration circuits 74 and 75. The input bus 73 to NOR gate 121 produces an output on line 122 which functions as a null detect signal that is applied to AND gate 123 of circuit 75. AND gate 123 has a second input produced from a request 0 and a request 1 on lines 57 which is coupled through OR gate 124 as the second input to AND gate 123. When the null detect signal is presented on the output of AND gate 123 on line 125, one of the plurality of sources will be selected. Stated differently if either source has a request IN when a null detect signal is produced on line 122, one of the two sources shown will be selected. AND gates 126 and 127 are both coupled to line 125 and to request 1 and request 0 respectively. Further, gate 127 is coupled to request 1 via inverter 123 to prevent simultaneous selection of gates 126 and 127. Thus, request 0 will raise an acknowledge 0 and request 1 will raise an acknowledge 1 on lines 79 and 81 respectively. The 24 data bits from source 0 and source 1 on line 77 and 78 are both presented as inputs to a first 2 to 1 selector 29A which is toggled by selector input 76A that is logically identical to the request 1 signal on line 58. Selector 29A selects source 0 unless enabled and toggled by the signal on line 58. The second 2 to 1 selector 29B will pass the information on data channel 28 through selector 29B unless enabled and toggled by the select source signal on lines 125 and 76B. The output on line 33 has been shown and described with reference to FIG. 1 and does not require addition explanation herein. However, it should be noted that if a request 0 and request 1 are raised simultaneously there will be a conflict for the acknowledge signal which is resolved by placing an inverter 128 between line 58 to an input to gate 127 which prioritized source 1 over source 0.

Refer now to FIG. 7 showing a truth table which will be employed to explain the output of the arbitration circuit 75 shown in FIG. 6. The null input signals on line 122, the request 1 signals on line 58 and the request 0 signals on line 57 present 8 binary combination for a source output on line 33 as shown in FIG. 7. When variations of the 8 binary combinations exist, they raise acknowledge 0 and acknowledge 1 signals as shown on lines 79 and 81 and no further explanation is required for this truth table.

Having explained the preferred embodiment circuits in FIGS. 1 through 7 it should be understood that the selection of fast acting logic elements is compatible with implementation on a gallium arsenide gate array to produce signals which interface with ECL functional elements on a circuit card assembly. The preferred embodiment interface circuit being implemented in gallium arsenide is capable of running at switching rates of 200 mega words per second. The same logic circuit can be implemented in ECL or TTL or CMOS technology when lower switching rates are permissible. One advantage of gallium arsenide technology is that it requires less power than ECL for the same frequency.

One of the features of the present invention is that it incorporates the ability to test gate array chips and associated CCA circuitry as well as the bus into which the CCA cards are inserted. The aforementioned high speed counter 16 and PRBS generator 17 described in FIG. 1 are employed to form dynamic test of the gate array chip, the CCA circuitry and any intermittent shorts in the circuits or motherboard. Further, the processor interface 18 is capable of providing static test data on line 19 to perform static test simulation throughout the gate array and the associated CCAs. Further it is possible to run software test programs by presenting the test words from an off chip processor through process interface 18 via line 19 into the gate array and CCA circuitry. Stated differently it is possible using the novel test circuitry to sequentially clock a test data word through the gate array and CCA circuitry without removing the CCAs from their environmental systems.

What is claim is:

1. A high speed interface unit circuit, comprising:
a data channel,
first selector means coupled in said data channel to receive parallel bit data words having an address field and a data field,
a first buffer register coupled to said first selector means to store said parallel bit words,
a second buffer register in said data channel coupled to the output of said first buffer register,
sink buffer register means,
sink enable means coupled between the said first buffer register and said sink buffer register means for detecting a match between the address field of said parallel bit data words and said sink address stored in said sink enable means and for storing said data field in said sink buffer register means in the presence of a match of said addresses,
second selector means coupled in said data channel to the output of said second buffer register means to receive parallel bit words,
output buffer means in said buffer channel coupled to the output of said second selector means,
pass through enable means coupled between said second buffer register and said output buffer means for selectively removing said parallel bit data words having a successfully detected match by said sink enable means,
source buffer register means coupled to the input of said second selector means, and
arbitration control means coupled to said second buffer register means for selecting the output of said second selector means or said source buffer register means as the output data word on said data channel.

2. A high speed interface unit circuit as set forth in claim 1 wherein said sink buffer register means comprises a plurality of pairs of double buffer registers connected in parallel to each other and operable simultaneously to store data words.

3. A high speed interface unit circuit as set forth in claim 2 wherein said sink enable means comprises a sink enable circuit coupled between said first buffer register means and each pair of double buffer registers for independently detecting a match between the address field of said parallel bit data words and a sink address stored in each sink enable circuit.

4. A high speed interface unit circuit as set forth in claim 1 which further includes null decode means coupled to said arbitration control means for selecting the output of said second buffer register or the output from said source buffer register means as the output data word on said data channel.

5. A high speed interface unit circuit is set forth in claim 4 wherein said source buffer register means comprises a plurality of source registers connected in parallel to said second selector means and selectable independently as a source of output data word on said data channel.

6. A high speed interface unit circuit as set forth in claim 1 wherein said output buffer means comprises a third buffer register in said data channel coupled to the output of said second selector means for buffering the output from said data channel.

7. A high speed interface unit circuit as set forth in claim 1 which further includes processor interface means having an output coupled to the input of said first selector means for introducing test data into said data channel.

8. A high speed interface unit circuit as set forth in claim 1 which further includes processor interface means having an output coupled to a programmable input of said pass through enable means.

9. A high speed interface unit circuit as set forth in claim 1 which further includes processor interface means having an output coupled to a programmable input of said sink buffer register means and said source buffer register means.

10. A high speed interface unit circuit as set forth in claim 1 which further includes data channel output buffer register means, and said source buffer register means being coupled to an input of said second selector means for introducing new data words into said data channel and said output buffer means.

11. A high speed interface unit circuit as set forth in claim 10 which further includes arbitration means coupled to said second selector means for selecting one of a plurality of new data words as an input into said data channel.

12. A high speed interface unit circuit as set forth in claim 11 which further includes clock selection means coupled to the input of said source buffer register means for synchronizing the new data words being read into said data channel.

13. A high speed interface unit circuit as set forth in claim 1 which further includes zero generator means coupled to said pass through enable means for detecting a match of said addresses and for generating zeros in said address field of said parallel bit data word.

14. A high speed interface unit as set forth in claim 13 which further includes null decode means for detecting the presence of zeros in said field address of said parallel bit data word.

* * * * *